United States Patent
Lo et al.

(10) Patent No.: US 10,496,067 B2
(45) Date of Patent: Dec. 3, 2019

(54) AUTOMATION AND CONTROL DISTRIBUTED DATA MANAGEMENT SYSTEMS

(71) Applicant: Siemens Aktiengesellschaft, Munich (DE)

(72) Inventors: George Lo, Langhorne, PA (US); Hartmut Ludwig, West Windsor, NJ (US); Justinian Rosca, Princeton Junction, NJ (US); Kurt Dirk Bettenhausen, West Windsor, NJ (US)

( * ) Notice: Subject to any disclaimer, the term of this patent is extended or adjusted under 35 U.S.C. 154(b) by 821 days.

(21) Appl. No.: 14/820,780

(22) Filed: Aug. 7, 2015

(65) Prior Publication Data

US 2017/0038754 A1 Feb. 9, 2017

(51) Int. Cl.
*G05B 19/42* (2006.01)
*G05B 19/05* (2006.01)

(52) U.S. Cl.
CPC ........... *G05B 19/052* (2013.01); *G05B 19/05* (2013.01); *G05B 2219/1144* (2013.01);
(Continued)

(58) Field of Classification Search
CPC ................. G05B 19/052; G05B 19/05; G05B 2219/1144; G05B 2219/1203;
(Continued)

(56) References Cited

U.S. PATENT DOCUMENTS

| 5,566,176 A * | 10/1996 | Chang ................. G05B 19/052 709/228 |
| 2002/0072809 A1* | 6/2002 | Zuraw ................ G05B 19/0428 700/9 |

(Continued)

FOREIGN PATENT DOCUMENTS

| CN | 101529345 A | 9/2009 |
| WO | 2016/137427 A1 | 9/2016 |

OTHER PUBLICATIONS

PCT International Search Report dated Sep. 29, 2016; Application No. PCT/US2016/043047; Filing Date: Jul. 20, 2016; 13 pages.

*Primary Examiner* — Zhipeng Wang

(57) ABSTRACT

A system for storing data in an industrial production environment includes a distributed database stored on a plurality of intelligent programmable logic controller devices. Each respective intelligent programmable logic controller device includes a volatile computer-readable storage medium containing a process image area; a non-volatile computer-readable storage medium; a control application; an input/output component; a historian component; and a distributed data management component. The control application is configured to provide operating instructions to a production unit. The input/output component is configured to update the process image area during each scan cycle with data associated with the production unit. The historian component is configured to store automation system data including the operating instructions and contents of the process image area on the non-volatile computer-readable storage medium. The distributed data management component is configured to facilitate distributed operations involving the automation system data by the plurality of intelligent programmable logic controller devices.

16 Claims, 4 Drawing Sheets

(52) U.S. Cl.
CPC ............... *G05B 2219/1203* (2013.01); *G05B 2219/1204* (2013.01); *G05B 2219/31324* (2013.01)

(58) Field of Classification Search
CPC .. G05B 2219/1204; G05B 2219/31324; G05B 19/056; G05B 19/054; G05B 2219/14018; G05B 2219/14055; G05B 2219/13103; G05B 2219/15108; G05B 2219/37537; Y02P 80/114
USPC ........................................ 700/3, 7, 19, 20, 86
See application file for complete search history.

(56) References Cited

U.S. PATENT DOCUMENTS

| | | | | |
|---|---|---|---|---|
| 2006/0259160 | A1* | 11/2006 | Hood | G05B 19/4188 700/20 |
| 2007/0075128 | A1* | 4/2007 | Hall | G06F 17/30575 235/376 |
| 2007/0208440 | A1* | 9/2007 | Bliss | G05B 19/056 700/87 |
| 2011/0102617 | A1* | 5/2011 | Seri | G06T 1/60 348/222.1 |
| 2012/0054441 | A1* | 3/2012 | Nakashima | G06F 11/1441 711/124 |
| 2012/0254517 | A1* | 10/2012 | Jang | G05B 19/05 711/103 |
| 2013/0211546 | A1* | 8/2013 | Lawson | G05B 19/4185 700/9 |
| 2014/0277604 | A1* | 9/2014 | Nixon | G05B 19/4185 700/47 |
| 2014/0344511 | A1* | 11/2014 | Kim | G06F 3/0661 711/105 |
| 2015/0074672 | A1 | 3/2015 | Yeddanapudi et al. | |
| 2015/0169650 | A1 | 6/2015 | Gajic | |
| 2015/0286204 | A1* | 10/2015 | Yamaoka | G05B 19/056 700/86 |
| 2016/0224001 | A1* | 8/2016 | Bruck | G05B 19/052 |
| 2017/0017221 | A1* | 1/2017 | Lamparter | G05B 19/056 |
| 2017/0032281 | A1* | 2/2017 | Hsu | B23K 9/0953 |

* cited by examiner

AUTOMATION AND CONTROL DISTRIBUTED DATA MANAGEMENT SYSTEMS

TECHNICAL FIELD

The present disclosure relates to a distributed data management system for Intelligent PLCs. The various systems and methods may be applied to industrial automation applications, as well as various other applications where Intelligent PLCs are used.

BACKGROUND

A programmable logic controller (PLC) is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system.

PLCs are utilized in various industrial settings to control production devices and other automation devices which generate a large amount of data in their daily operations. This data may include, for example, sensor data, actuator and control program parameters, and information associated with service activities. However, conventional automation systems, and conventional PLCs in particular, are not capable of fully utilizing this data. For example, in most systems, due to hardware and software limitations, only a small fraction of this data can be analyzed and stored. Massive amounts of irrelevant data may be produced while important data points are missed. Compression may be applied at the higher automation layers on unimportant data, while important data is lost while travelling through the automation layers. Moreover, even where there are attempts to avoid the loss of data, there may be significant demands placed on the rest of the computing infrastructure. For example, the PLC data processing may result in a high demand on the network bandwidth as well as storage capacity. Additionally, the context of data may be lost while data passes through automation system layers. This causes several undesired secondary effects on the automation system. For example, if data analytics are performed at higher automation layers based on low quality/fidelity data, important data may be lost causing the automation system to operate inefficiently or sub-optimally.

Recent advances in control layer devices have addressed some of the inefficiencies of the system by providing enhanced storage and processing capabilities within the device. However, the capabilities are generally underutilized in conventional systems which force the control layer device to fit within the paradigm of the multi-layer architecture discussed above. Accordingly it is desired to modify the conventional multi-layer architecture in a manner that leverages the collective computing capability of modern PLCs.

SUMMARY

Embodiments of the present invention address and overcome one or more of the above shortcomings and drawbacks, by providing methods, systems, and apparatuses related to a distributed storage system provided by control layer devices such as Intelligent PLCs. The technology described herein is particularly well-suited for, but not limited to, various industrial automation applications.

According to some embodiments, a system for storing data in an industrial production environment includes a distributed database stored on a plurality of intelligent programmable logic controller devices. Each respective intelligent programmable logic controller device includes a volatile computer-readable storage medium comprising a process image area; a non-volatile computer-readable storage medium; a control application; an input/output component; a historian component; and a distributed data management component.

In each intelligent programmable logic controller, the control application is configured to provide operating instructions to a production unit. The input/output component is configured to update the process image area during each scan cycle with data associated with the production unit. The historian component is configured to store automation system data comprising the operating instructions and contents of the process image area on the non-volatile computer-readable storage medium. Additionally, in some embodiments, the historian component compresses the automation system data prior to storing the contents on the non-volatile computer-readable storage medium. The distributed data management component is configured to facilitate distributed operations involving the automation system data by the plurality of intelligent programmable logic controller devices. In one embodiment, the distributed data management component is further configured to partition the automation system data into data blocks prior to storing the automation system data on the non-volatile computer-readable storage medium. These data blocks may be sized, for example, according to a predetermined time period.

Additional components may be included in each respective intelligent programmable logic controller. For example, in one embodiment, each intelligent programmable logic controller device includes a contextualization component which is configured to annotate the data associated with the production unit with automation system context information to generate contextualization data.

The aforementioned system may be adapted in various ways to support different distributed file storage methodologies. For example, in some embodiments, each respective intelligent programmable logic controller device is a data node in a distributed file system cluster and at least one of the plurality of intelligent programmable logic controller devices is a name node in the distributed file system cluster. In one embodiment, each respective intelligent programmable logic controller device comprises a sharding key definition which provides a mapping between data stored in the distributed data management system and the intelligent programmable logic controller devices. The sharding key definition may be stored, for example, on a centralized server accessible to each of the plurality of intelligent programmable logic controller devices.

According to other embodiments of the present invention, a method for storing data in an industrial production environment includes a first intelligent programmable logic controller executing a control application which is configured to provide operating instructions to a production unit over a plurality of scan cycles. The first intelligent programmable logic updates a process image area during each of the plurality of scan cycles with data associated with the production unit and inserts the data associated with the production unit into local non-volatile computer readable medium on the first intelligent programmable logic controller. For this method, the local non-volatile computer readable medium is part of a distributed storage system stored across the first intelligent programmable logic controller and a plurality of second intelligent programmable logic controllers. To facilitate storage, the local non-volatile computer readable medium may include, for example, a NoSQL database which has a table equivalent view.

The aforementioned method can be adapted and/or refined with various additional features in different embodiments of the present invention. For example, in some embodiments, the first intelligent programmable logic controller partitions the data associated with the production unit into data blocks (e.g., sized according to a predetermined time period). In some embodiments, storage of at least one of data blocks is replicated on one or more of the plurality of second intelligent programmable logic controllers. Additionally, insertion of the data associated with the production unit into the local non-volatile computer readable medium may be triggered based on different events. For example, in some embodiments, this insertion is triggered based on changes to the operating instructions and the data associated with the production unit. In other embodiments, the insertion is triggered based on a change to one or more monitored I/O flags.

According to another aspect of the present invention, an article of manufacture for operating an intelligent programmable logic controller over a plurality of scan cycles includes a non-transitory, tangible computer-readable medium holding computer-executable instructions for performing the aforementioned method, with or without the additional features discussed above.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to a distributed storage system implemented across a plurality of intelligent programmable logic controllers, referred to herein as "Intelligent PLCs." Briefly, each Intelligent PLC includes a historian component which is integrated into the distributed data management system. Each historian component stores the process image of its respective Intelligent PLC, along with analytics, contextualization, and other derived information. The term distributed data management system, as used herein refers to any system which provides distributed storage and distributed processing (e.g., through map/reduce at the embedded level) of data sets on Intelligent PLCs. Thus, the distributed storage system described herein may be implemented, for example, using a distributed file system (e.g., the Hadoop DFS) or a distributed database management system (e.g., MongoDB). Using this system, a consistent distributed historian view can be maintained through the historian stacks at the node level and may be the basis for further distributed data management, embedded analytics, and other data-based distributed services. The techniques described herein may be used, for example, to provide a coherent image of time, data (e.g., time series data), data organization, and data names across an industrial automation system and make data available immediately as it is created.

Figure 1:
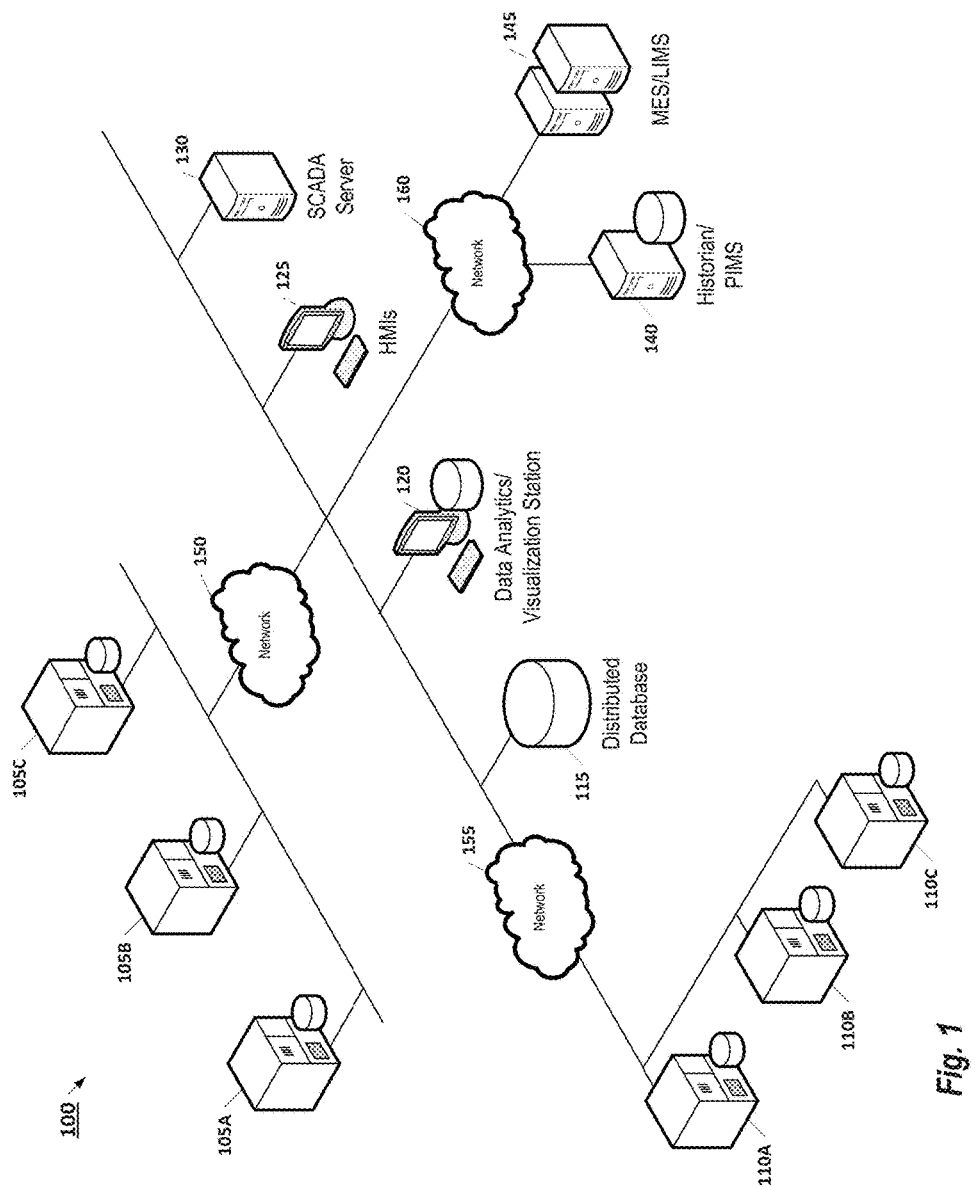
FIG. 1 provides an architecture diagram illustrating an industrial automation system where Intelligent PLCs form a distributed data management system for automation system data, according to some embodiments.

FIG. 1 provides an architecture diagram illustrating an industrial automation system 100 where Intelligent PLCs form a distributed data management system for automation system data, according to some embodiments. Briefly, the Intelligent PLC offers several technical features which may be present in various combinations, according to different embodiments. For example, the Intelligent PLC include an efficient storage mechanism for time series data (i.e., a "historian" function) which allows short/mid-term archiving of high resolution time-stamped data. With high fidelity data, few, if any, events are lost. Efficient compression algorithms (e.g. a variation of swinging door) may be used to reduce storage and communication demands. The Intelligent PLC is discussed in greater detail below with respect to FIG. 2. It should be noted that FIG. 1 represents a high-level, simplified overview of an architecture that may be used with the techniques described herein. This architecture can be modified to include additional devices that may be present in real-world implementations such as, for example, routing devices, connections to additional data networks, etc.

Distributed data management may be implemented over the industrial automation system 100 using different techniques in different embodiments. In some embodiments, a distributed file system (DFS) is used for storage of data across the devices generated by the Intelligent PLCs 105A, 105B, 105C, 110A, 110B, and 110C. A DFS offers the ability to quickly scale in terms of processing power and storage at a very low comparable cost to distributed database system. Thus, for applications that include many parallelizable processing operations, a DFS may provide a more efficient solution for the distributed storage of data. In other embodiments, the Intelligent PLCs are used to implement a robust distributed database management system that provides properties like Atomicity, Consistency, Isolation and Durability may be used, along with scalability and processing capabilities may be used. It can provide a data management layer that supports querying in a SQL like manner, as an abstraction of a partitioned data access on many nodes, and also functions that can take advantage of data processing locally on nodes where the data resides (i.e., data locality).

In the example of FIG. 1, the nodes of the distributed data management system employed by the industrial automation system 100 include Intelligent PLCs 105A, 105B, 105C, 110A, 110B, and 110C. Although FIG. 1 only shows six Intelligent PLCs, it should be understood that any number of Intelligent PLCs may be used with the techniques described herein. Thus, the distributed data management system supported by architecture provided in FIG. 1 may dynamically grow and shrink by adding or removing computing resources depending on the system needs. Moreover, the storage capacity of the distributed data management system can be increased by adding dedicated or commodity hardware resources (e.g., server racks, additional controllers). For example, as explained in greater detail below, in some embodiments, a Distributed Database 115 server is added as a node of the distributed data management system to provide long-term storage of data stored on the Intelligent PLCs 105A, 105B, 105C, 110A, 110B, and 110C.

Each Intelligent PLC 105A, 105B, 105C, 110A, 110B, and 110C comprises a distributed data management component. In some embodiments, the distributed data management component included at each Intelligent PLC is capable of storing data originated from the controller through the same interface into shared memory or on the file system. For example, as discussed in greater detail below with respect to FIG. 3, each Intelligent PLC 105A, 105B, 105C, 110A, 110B, and 110C comprises an embedded process historian that has a local view of the names, meaning, and organization of data historized locally. Using the distributed data management component, data generated by each respective historian can be shared across the system 100.

The data stored at each Intelligent PLC 105A, 105B, 105C, 110A, 110B, and 110C may be consumed by client applications that run inside controllers or on any device that has access to the distributed data management system provided by the system 100 shown in FIG. 1. In addition to storage, each Intelligent PLC 105A, 105B, 105C, 110A, 110B, and 110C may also include cluster management services and a processing engine, which allows tasks such as distributed storage and communication, as well as distributed processing and coordination.

The technique used to locate and manage data across the Intelligent PLC 105A, 105B, 105C, 110A, 110B, and 110C may vary according to how distributed storage is implemented. For example, in embodiments where a DFS such as the Hadoop DFS is used for distributed storage, one or more of the Intelligent PLC 105A, 105B, 105C, 110A, 110B, and 110C serve as a "name node." Each name node manages a directory tree of all files in the DFS, and tracks where across the system 100 the file data is stored. Client applications can communicate with the name node to locate a file or to perform operations on the file (adding, copying, move, delete, etc.). The name node responds the successful requests by returning a list of relevant devices where the data is stored. It should be noted that the name node is a single point of failure for the DFS. Thus, in some embodiments, multiple name nodes may be used to provide redundancy.

In embodiments where a distributed database management system is used to implement distributed storage, data may be stored on the Intelligent PLC 105A, 105B, 105C, 110A, 110B and 110C using sharding techniques. As is well understood in the art, sharding is the strategy a distributed database uses for locating its partitioned data. This mechanism is often used to support deployments with data sets that require distribution and high throughput operations. This is done through a sharding key definition that is the criteria used to separate data between controllers. The sharding mapping may be stored by a specific server instance or inside each controller. In both cases, the sharding information is accessible to all devices. Each sharding key holder device can coordinate the data transferring process with other peers, since the sharding metadata holds the data/controller location mapping. Thus, a distributed data management system (such as the one implemented using Intelligent PLC 105A, 105B, 105C, 110A, 110B and 110C) can provide parallelization and low data traffic across the network.

The Intelligent PLCs 105A, 105B, 105C, 110A, 110B, and 110C may communicate with one another via network connection using standard networking protocols (e.g., TCP, RPC, etc.). Such communication may be used, for example, to implement distributed data fetching and distributed processing tasks. In both cases, the process may be initiated from any controller, and the latter will trigger new connections to other controllers that store the needed data. Note that broadcast messages do not need to be sent across the various networks, as only the controllers that have the requested data are targeted by the coordinator (e.g., the controller which started the data fetching or distributed processing task/Map Reduce job), eliminating unnecessary network traffic. Furthermore, if the processing is a distributed processing task, then no data will be passed over the network except the results of the processing. This is achieved by sending the computation code and executing it on the controller that holds the data of interest.

In addition to communicating with one another, Intelligent PLCs 105A, 105B, 105C, 110A, 110B, and 110C may also communicate with any other TCP, Open Database Connectivity (ODBC), and/or OPC Unified Architecture (UA) clients such as a Distributed Database 115, a Data Analytics/Visualization Station 120, one or more Human-machine Interfaces (HMIs) 125, a SCADA Server 130, a Historian/PIMs Server 140, and servers 145 associated with Manufacturing Execution Systems (MES) and/or Laboratory Information Management Systems (LIMS). Each component of the architecture may be connected using a local intranet (e.g., implemented via Ethernet) and one or more internets 150, 155, 160.

The Distributed Database 115 is a high capacity storage server that stores data that is no longer available on the Intelligent PLCs 105A, 105B, 105C, 110A, 110B, and 110C. This data is still available to the distributed data management system and behaves just like another distributed node in the system. The Distributed Database 115 may be implemented, for example, using a NoSQL, scalable and fast data storage which can provide real-time distributed long term data access. It may include an ODBC connector, similar to other relational database configurations.

Any client station in the industrial automation system 100 can inject algorithms from the Algorithms Store into one or more of the Intelligent PLCs 105A, 105B, 105C, 110A, 110B, and 110C. The Intelligent PLCs 105A, 105B, 105C, 110A, 110B, and 110C may execute the algorithm on a distributed fashion (on multiple controllers) and then aggregate and send the results to the client station. In the example of FIG. 1, a Data Analytics/Visualization Station 120 holds also the Application/Algorithms Store, which can be uploaded and executed on the Intelligent PLCs 105A, 105B, 105C, 110A, 110B, and 110C. Additionally, in some embodiments, human-machine interfaces (HMIs) 125 located throughout the production facility may be used to access the distributed data management system, either directly or via the Data Analytics/Visualization Station 120. In some embodiments, the Data Analytics/Visualization Station 120 may include a graphical user interface (GUI) configured to, for example, receive requests for data stored in a distributed data management system applications and/or display visualizations related to data stored across the distributed database system. Similar functionality may also be available at the HMIs 125 or other components of the system.

The distributed data management system provided by the Intelligent PLCs 105A, 105B, 105C, 110A, 110B, and 110C is interoperable with existing automation infrastructure components. For example, the Supervisory Control and Data Acquisition (SCADA) Server 130 can connect and pull distributed data from Intelligent PLCs 105A, 105B, 105C, 110A, 110B, and 110C as well as other components of the system (e.g., Distributed Database 115) using OPC UA and/or ODBC clients. Similarly, the Historian/PIMs Server 140, and servers associated with MES/LIMS 145 may access data across the distributed data management system, with little or no modification to their existing operations. As time and resources allow, these higher-layer components may be modified to more efficiently operate with the distributed data management component included at each of Intelligent PLCs 105A, 105B, 105C, 110A, 110B, and 110C.

Figure 2:
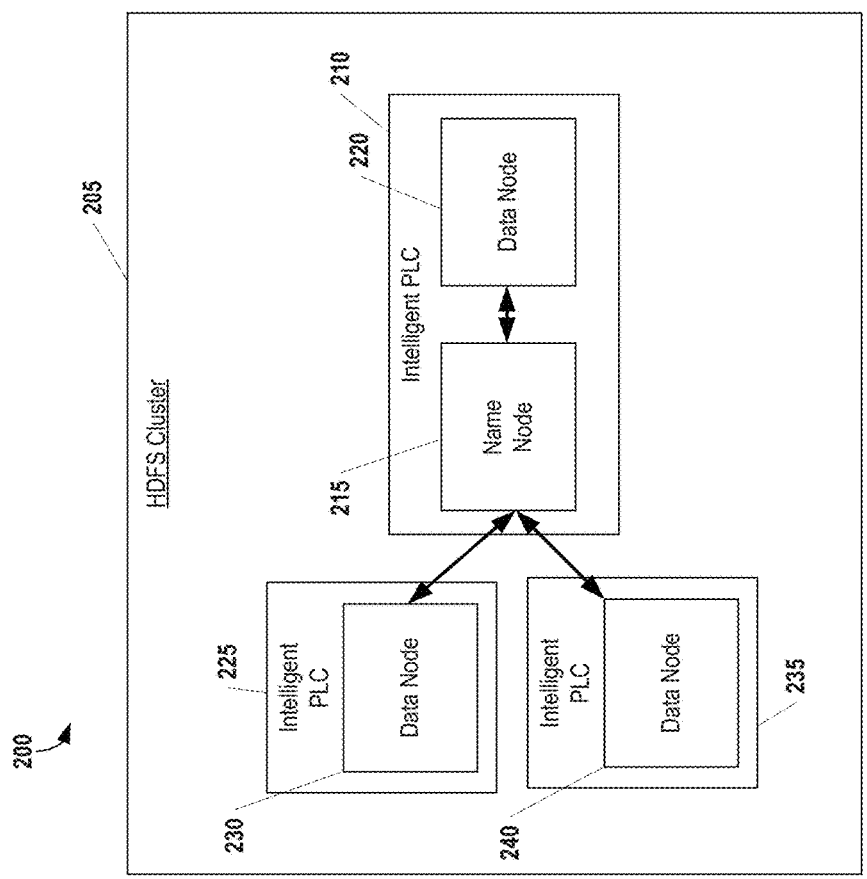
FIG. 2 provides a distributed file system architecture that may be applied for storage in the system of FIG. 1, according to some embodiments.

FIG. 2 provides a DFS architecture 200 that may be applied for storage in the system 100, according to some embodiments. In this example, the Hadoop Distributed File System (HDFS) is used for storage. As is understood in the art, the HDFS divides large client datasets (typically terabytes in size) into smaller data blocks (typically 64 megabytes), with each data block stored in more than one data node for high availability. The HDFS comprises interconnected clusters of nodes which store files and directories. In the example of FIG. 2, one cluster 205 is shown. However, it should be understood that the DFS architecture 200 may be scaled to any number of clusters. The cluster 205 includes three Intelligent PLCs 210, 225, and 235. Each of these three Intelligent PLCs 210, 225, and 235 includes a data node. These data nodes 220, 230, and 240 operate with the local historian at each Intelligent PLC to store automation system data using a block protocol specific to HDFS. Additionally the data nodes 220, 230, and 240 may communicate to rebalance data, move, and copy data around and maintain a high degree of replication.

Continuing with reference to FIG. 2, the Intelligent PLC 210 in this example acts as the server for the cluster 205. It includes a name node 215 that manages the file system namespace with operations such as opening, closing, renaming files, etc. Additionally, the name node maps data blocks to nodes in the cluster 205 and regulates access to files. The name node 215 may also provide instructions to other nodes in the cluster 205 related to the creation, deletion and replication of data.

The Hadoop parallel processing framework may be used to map parallel computing jobs to the data nodes 220, 230, 240, and then reduce the returned intermediate results into the final result. The DFS architecture 200 includes a daemon service (not shown in FIG. 2) for submitting and tracking MapReduce jobs. As is understood in the art, MapReduce is a programming model for processing and generating data sets with a parallel, distributed algorithm on a distributed system such as illustrated in FIG. 2. In some embodiments, this daemon is executed on one of the Intelligent PLCs 210, 225, and 235. In other embodiments, the daemon may be executed on a separate computing device which is connected to the Intelligent PLCs 210, 225, and 235 over a computer network. Regardless of its implementation, the daemon service may be used, for example, to perform distributed analytics and other operations on the automation data stored by the historian component of each of Intelligent PLCs 210, 225, and 235.

Figure 3:
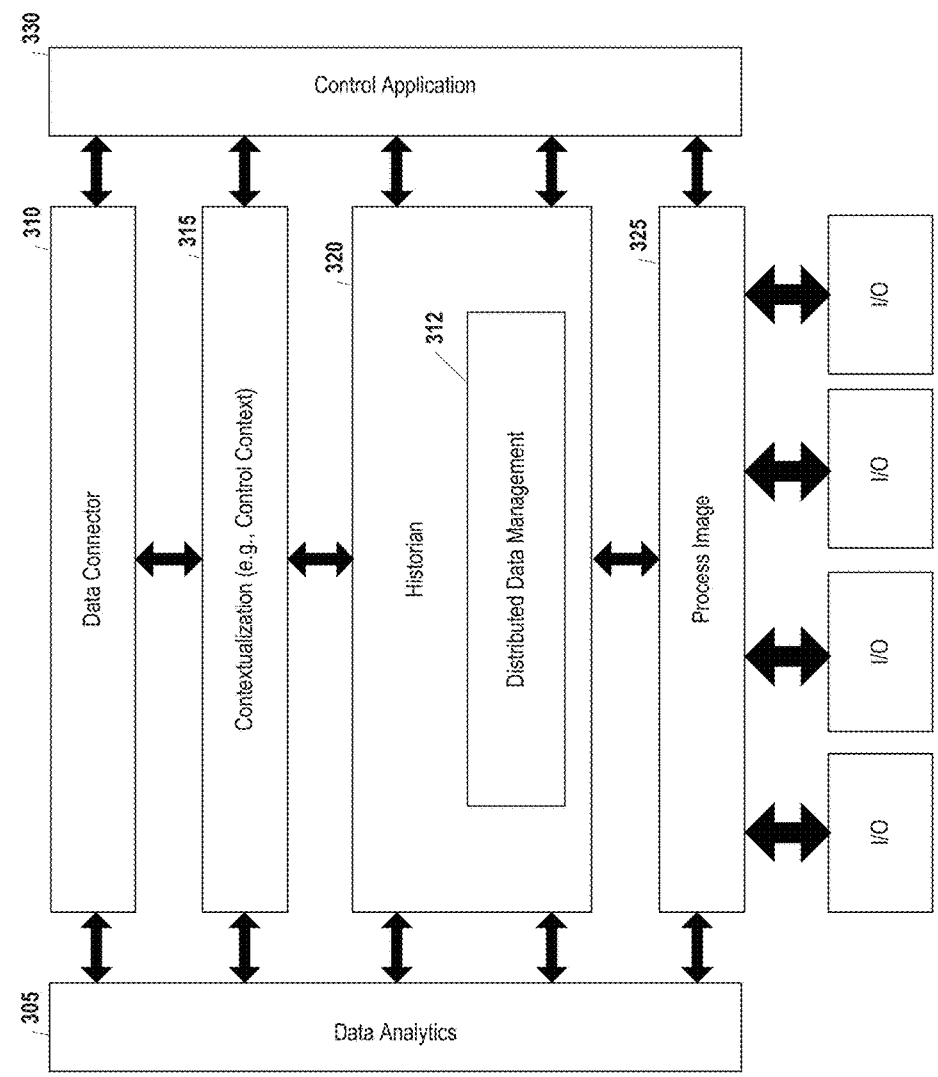
FIG. 3 provides an illustration of the system components included in an Intelligent PLC, according to some embodiments.

FIG. 3 provides a conceptual view of an Intelligent PLC 300, according to some embodiments. Process Image Component 325 is a memory area in a controller's CPU volatile system memory which is updated in each processing/scan cycle based on data associated with the production devices (e.g., the inputs and outputs of connected I/Os). In each processing step, the Control Application 330 reads the Process Image Component 325, executes deployed application logic, and writes results back into the Process Image Component 325.

Continuing with reference to FIG. 3, the process image of each cycle is read and permanently stored on a non-volatile physical storage medium by the Historian Component 320. In some embodiments, this Historian Component 320 is configured to deploy data compression algorithms to reduce data volume and provide applications with access to past process images. Data may be stored either for a fixed time window or online algorithms are used to realize dynamic caching heuristics. As part of the Historian Component 320, intelligent data generation algorithms may continuously analyze the process image and context to adjust data generation parameters (e.g. sampling rate) of connected I/Os. For example, for fast changing sensor signals, a high sampling rate may be selected while for slowly changing sensor signals a lower sampling rate is sufficient.

The Data Analytics Component 305 comprises a set of data analysis algorithms that process the current or past process images (queried from the historian). Various data analysis algorithms may be included in the Data Analytics Component 305. For example, in some embodiments, these algorithms include one or more of clustering, classification, logic-based reasoning, and statistical analysis algorithms. Moreover, algorithms may be specified via a model which can be deployed during runtime on the device. The Data Analytics Component 305 may also include various analytical models and dedicated algorithms to interpret these models. The results generated by the Data Analytics Component 305 may be stored in the Historian Component 320, written back to the Process Image Component 325 and/or provided to external components via the Data Connector Component 310. Thus, the Intelligent PLC may be viewed as a device for providing distributed analytics to the other devices in the automation system.

A Contextualization Component 315 annotates incoming data with context information to facilitate its later interpretation. Context information, as used herein, may include any information that describes the meaning of data. For example, context of data in automation systems may include information about the device that generated the data (e.g., a sensor), about the structure of the automation system (e.g., topology of a plant), about the working mode of the system (e.g., downtime event), about the automation software and its status while the data was generated, and/or about the product/batch that was produced while the data was generated. The Contextualization Component is configured to provide data to any of the other components for more specific processing needs. The context information generated by the Contextualization Component 315 may not be restricted to the asset structure but may also include control knowledge, product-specific information, process information, event information, and potentially other aspects such external events like weather information. Some context information may be imported from engineering tools (e.g. Siemens Totally Integrated Automation tools). Additionally, in some embodiments, the Contextualization Component 315 provides semantic contextualization. The context may be represented by a standard modeling language (e.g. Web Ontology Language, Resource Description Framework) where the meaning of the language constructs is formally defined. Contextualization of data with these semantic modeling standards enables business analytics applications to automatically understand and interpret the data provided from the automation system without manual configuration effort.

A Distributed Data Management Component 312 allows the Intelligent PLC 300 to operate as part of a distributed data management system (see, e.g., FIG. 1) or a distributed file system (see, e.g., FIG. 2). Using the Distributed Data Management Component 312, the Intelligent PLC can share data generated by the Historian Component 320 (or other components shown in FIG. 3) with the other devices operating in the industrial automation system. In this way, the Intelligent PLC's 300 historical, contextual, analytical view of the system may be shared with controllers and other devices using a parallel distributed processing algorithm. For example, the Historian Component 320 has a local view of the names, meaning, and organization of data historized locally by the Intelligent PLC 300. Using the Distributed Data Management Component 312, this view of the automation system may be shared.

For embodiments where a DFS is used for storage, the Distributed Data Management Component 312 will be an embedded process providing suitable DFS functionality. For example, in embodiments that use the previously mentioned Hadoop DFS, the Distributed Data Management Component 312 may be the software that allows the Intelligent PLC 300 to operate as a data node with in the cluster (see FIG. 2). As such, the Distributed Data Management Component 312 may be used to format and organize blocks of historian data into data chunks that may be transferred, replicated, and processed throughout the cluster. In some embodiments, the Distributed Data Management Component 312 may also be used to obtain from name nodes the addresses of other data nodes where the newly created data chunk is to be replicated without transformation for storage or computation. In other embodiments, Distributed Data Management Component 312 may be configured such that the Intelligent PLC 300 functions as the name node for the cluster and the addresses are stored locally. Once the addresses are obtained the Distributed Data Management Component 312 may be used to autonomously manage data transfer of the chunk of historian data to the other nodes in the cluster. Using the Distributed Data Management Component 312, the Intelligent PLC 300 and other similar devices in the automation environment can implement the historian stack as a parallel distributed processing algorithm, where each embedded process historian on a node has the above functionality.

In embodiments where a distributed data management system is used for distributing storage across the system, the Distributed Data Management Component 312 may be implemented using various database systems generally known in the art. For example, in some embodiments, the data stored at each controller is stored in a NoSQL database which has a table equivalent structure. As is understood in the art, the term "NoSQL" is used to define a class of data stores that are non-relational in their design. There are various types of NoSQL databases which may be generally grouped according to their underlying data model. These groupings may include databases that use column-based data models (e.g., Cassandra), document-based data models (e.g., MongoDB), key-value based data models (e.g., Redis), and/or graph-based data models (e.g., Allego). Any type of NoSQL database may be used to implement the various embodiments described herein. In some embodiments, historian data is stored across the distributed data management system in a block of data specific database format and organization that is optimized for the distributed data fabric. The size of each block may be specified, for example, based on a desired time granularity of the data or a maximum number of variables to be tracked.

Any data captured or generated by the components of Intelligent PLC 300 may be provided to external components via a Data Connector Component 310. Thus, for example, the Intelligent PLC can communicate with name nodes to obtain the addresses of other data nodes where the newly created block of historian data can be replicated without transformation for storage or computation. Moreover, using the underlying technology of the fabric, the device can autonomously manage its data transfer. In some embodiments, the Data Connector Component 310 delivers data via a push methodology (i.e., actively sending data to external component). In other embodiments, a pull methodology may be used where data is queried by external component). Additionally, push and pull methodologies may be combined in some embodiments such that the Intelligent PLC is configured to handle both forms of data transfer.

Additional examples of Intelligent PLC features that may be used in conjunction with different embodiments are provided in U.S. patent application Ser. No. 14/467,125 filed Aug. 25, 2014 and entitled "INTELLIGENT PROGRAMMABLE LOGIC CONTROLLER"; PCT Patent Application No. PCT/US14/63105 filed Oct. 30, 2014 and entitled "USING SOFT-SENSORS IN A PROGRAMMABLE LOGIC CONTROLLER"; PCT Patent Application No. PCT/US14/62796 filed Oct. 29, 2014 and entitled "SYSTEM AND METHOD FOR AUTOMATIC COMPRESSION ALGORITHM SELECTION AND PARAMETER TUNING BASED ON CONTROL KNOWLEDGE." The entirety of each of the foregoing applications is incorporated herein by reference.

Figure 4:
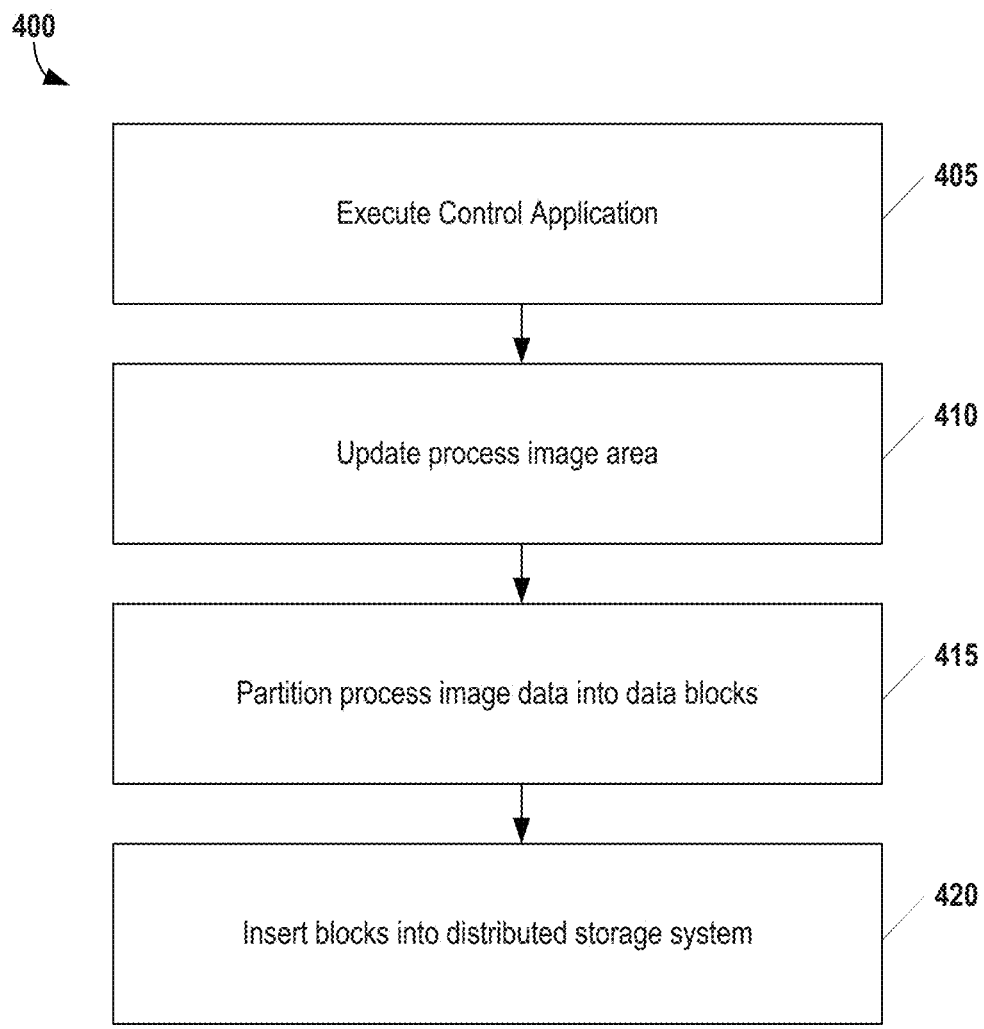
FIG. 4 provides an overview of a process for populating a distributed storage system with data in an industrial production environment, according to some embodiments.

FIG. 4 provides an overview of a process 400 for populating a distributed storage system with data in an industrial production environment, according to some embodiments. This process may be performed, for example, by the historian component executing on each Intelligent PLCs in the industrial production environment. As shown in FIG. 3, each Intelligent PLC executes a control application, which includes operating instructions for a production unit. At step 405, these instructions are stored by each respective Intelligent PLC. Next, at step 410, each Intelligent PLC updates its respective process image with data associated with its corresponding production unit. Then, at step 415, the data associated with the production unit is partitioned into one or more data blocks sized, for example, to capture a predetermined period of time (e.g., 5 ms). The organization and format of these blocks may be based on the requirements of the underlying distributed storage system.

At step 420, each Intelligent PLC inserts its respective one or more data blocks into a local non-volatile computer readable medium (e.g., solid state storage) that is part of the distributed storage system. This insertion may be based on, for example, changes to the operating instructions and the data associated with the production unit and/or change to one or more monitored I/O flags. Once the data blocks are inserted into the distributed storage system, they may be replicated such that multiple copies of the blocks are stored on different Intelligent PLCs.

At this point, the Intelligent PLCs may perform operations on the data stored in the distributed storage system. For example, in one embodiment, one Intelligent PLC (or a connected server) may receive a processing request and determine one or more of the other Intelligent PLCs are storing portions of the distributed database needed to respond to the request. Next, the Intelligent PLC may then transmit a processing instruction or data response to each of those other Intelligent PLCs. The information received in response from those Intelligent PLCs may then be aggregated to provide a response to the original request.

By using distributed data management techniques, the need to transport data in real time to a central location may be minimized or eliminated altogether. Thus, processing logic may be made available where the data is generated. Moreover, the distributed data analytic techniques allow Intelligent PLCs to learn from one another by generating and distributing knowledge throughout the system. The technology described herein may be used for example, to implement a distributed analytic platform at a lower level within an industrial computing architecture utilizing the concept of distributed data management for Intelligent PLCs.

The processors described herein as used by Intelligent PLCs may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, the Intelligent PLCs and related computing infrastructure may comprise at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. An industrial automation system for storing data in an industrial production environment, the system comprising:
a distributed data management system stored on a plurality of intelligent programmable logic controller devices, wherein each respective intelligent programmable logic controller device of the plurality of intelligent programmable logic controller devices comprises:
a volatile computer-readable storage medium comprising a process image area;
a non-volatile computer-readable storage medium;
a control application configured to provide operating instructions to a production unit of the industrial automation system;
an input/output component configured to update the process image area during each scan cycle of each respective intelligent programmable logic controller of the plurality of intelligent programmable logic controller devices with data associated with the production unit of the industrial automation system;

a historian component configured to store automation system data comprising the operating instructions and contents of the process image area on the non-volatile computer-readable storage medium; and a distributed data management component configured to facilitate distributed operations involving the automation system data by the plurality of intelligent programmable logic controller devices, wherein the distributed data management component included in each respective intelligent programmable logic controller of the plurality of intelligent programmable logic controller devices is further configured to partition the automation system data into a plurality of data blocks prior to storing the automation system data on the non-volatile computer-readable storage medium, wherein each respective intelligent programmable logic controller device of the plurality of inelegant programmable logic controller devices forms a respective data node in a distributed file system cluster arranged in a parallel processing framework to map parallel computing lobs to data nodes corresponding to the plurality of intelligent programmable logic controller devices, wherein at least one of the plurality of intelligent programmable logic controller devices further forms a name node in the distributed file system cluster, wherein the parallel processing framework in the distributed file system cluster is configured to perform at least parallel distributed analytics on the automation system data stored by the historian component in each respective intelligent programmable logic controller device of the plurality of intelligent programmable logic controller devices, and effective to provide a consistent distributed historian view maintained through respective historian stacks at a node level.

2. The industrial automation system of claim 1, wherein each of the plurality of data blocks is sized according to a predetermined time period.

3. The industrial automation system of claim 1, wherein each respective intelligent programmable logic controller device further comprises:
a contextualization component configured to annotate the data associated with the production unit with automation system context information to generate contextualization data.

4. The industrial automation system of claim 3, wherein the automation system data further comprises the contextualization data.

5. The industrial automation system of claim 1, wherein the historian component included in each of the plurality of intelligent programmable logic controller devices is further configured to:
compress the automation system data prior to storing the contents on the non-volatile computer-readable storage medium.

6. The industrial automation system of claim 1, wherein each respective intelligent programmable logic controller device comprises:
a sharding key definition providing a mapping between data stored in the distributed data management system and the plurality of intelligent programmable logic controller devices.

7. The industrial automation system of claim 6, further comprising:
a centralized server accessible to each of the plurality of intelligent programmable logic controller devices and configured to store the sharding key definition.

8. A method for storing data in an industrial production environment, the method comprising:
executing, by a first intelligent programmable logic controller, a control application configured to provide operating instructions to a production unit of an industrial automation system over a plurality of scan cycles of the first intelligent programmable logic controller;
updating, by the first intelligent programmable logic controller, a process image area during each of the plurality of scan cycles of the first intelligent programmable logic controller with data associated with the production unit of the industrial automation system; and
inserting, by the first intelligent programmable logic controller, the data associated with the production unit of the industrial automation system into a local non-volatile computer readable medium in the first intelligent programmable logic controller,
wherein the local non-volatile computer readable medium is part of a distributed storage system stored across the first intelligent programmable logic controller and a plurality of second intelligent programmable logic controllers,
wherein prior to inserting the data associated with the production unit of the industrial automation system into the local non-volatile computer readable medium in the first intelligent programmable logic controller, partitioning the data associated with the production unit of the industrial automation system into a plurality of data blocks,
wherein the first intelligent programmable logic controller and the plurality of second intelligent programmable logic controllers each forms a respective data node in a distributed file system cluster, and
arranging the distributed file system cluster in a parallel processing framework effective to map parallel computing jobs to data nodes corresponding to the first intelligent programmable logic controller and the plurality of second intelligent programmable logic controllers,
wherein the parallel processing framework in the distributed file system cluster is configured for performing at least parallel distributed analytics on automation system data stored in the distributed storage system, and effective for providing a consistent distributed historian view maintained through respective historian stacks at a node level.

9. The method of claim 8, wherein each of the plurality of data blocks is sized according to a predetermined time period.

10. The method of claim 8, further comprising:
replicating storage of at least one of the plurality of data blocks on one or more of the plurality of second intelligent programmable logic controllers.

11. The method of claim 8, wherein the local non-volatile computer readable medium on the first intelligent programmable logic controller comprises a NoSQL database which has a table equivalent view.

12. The method of claim 11 wherein the insertion of the data associated with the production unit into the local non-volatile computer readable medium is triggered based on changes to the operating instructions and the data associated with the production unit of the industrial automation system.

13. The method of claim 11, wherein the insertion of the data associated with the production unit of the industrial automation system into the local non-volatile computer readable medium is triggered based on a change to one or more monitored I/O flags.

14. An article of manufacture for operating an intelligent programmable logic controller in an industrial automation system over a plurality of scan cycles of the intelligent programmable logic controller, the article of manufacture comprising a non-transitory, tangible computer-readable medium holding computer-executable instructions for performing a method comprising:

creating a process image area in a volatile computer-readable storage medium operably in the intelligent programmable logic controller;

updating the process image area during each scan cycle of the intelligent programmable logic controller with contents comprising data associated with a production unit of the industrial automation system; and storing the contents of the process image area during each scan cycle of the intelligent programmable logic controller in a non-volatile computer-readable storage medium operably in the intelligent programmable logic controller, wherein the non-volatile computer-readable storage medium is part of a distributed file system spanning the intelligent programmable logic controller and a plurality of additional intelligent programmable logic controllers in the industrial automation system, wherein prior to storing the contents of the process image area in the non-volatile computer-readable storage medium operably in the intelligent programmable logic controller, partitioning the contents of the process image area into a plurality of blocks that are distributed across the intelligent programmable logic controller and the plurality of additional intelligent programmable logic controllers in the industrial automation system, wherein the intelligent programmable logic controller and the plurality of additional intelligent programmable logic controllers each forms a respective data node in a distributed file system cluster, wherein the distributed file system cluster is arranged in a parallel processing framework effective to map parallel computing jobs to data nodes corresponding to the intelligent programmable logic controller and the plurality of additional intelligent programmable logic controllers, wherein the parallel processing framework in the distributed file system cluster is configured to perform at least parallel distributed analytics on automation system data stored in the distributed storage system, and effective to provide a consistent distributed historian view maintained through respective historian stacks at a node level.

15. The article of manufacture of claim 14, storage of one or more of the plurality of blocks is replicated across the intelligent programmable logic controller and the plurality of additional intelligent programmable logic controllers.

16. The article of manufacture of claim 15, wherein the method further comprises:

receiving a request for analytic information corresponding to process image data;

creating a plurality of parallel processing jobs;

distributing the plurality of parallel processing jobs to the intelligent programmable logic controller and the plurality of additional intelligent programmable logic controllers;

receiving results from the intelligent programmable logic controller and the plurality of additional intelligent programmable logic controllers in the industrial automation system in response to distributing the plurality of parallel processing jobs; and aggregating the results to provide a response to the request for analytic information.

* * * * *